United States Patent [19]

Brown et al.

[11] 3,784,735

[45] Jan. 8, 1974

[54] COLOR TELEVISION WITH CONTROL OF A WOBBLING BEAM

[75] Inventors: Earl Franklin Brown, Piscataway; William Kaminski, West Portal, both of N.J.

[73] Assignee: Bell Telephone Laboratories, Incorporated, Murray Hill, Berkeley Heights, N.J.

[22] Filed: Mar. 29, 1972

[21] Appl. No.: 239,269

[52] U.S. Cl. .................................................. 178/5.4

[51] Int. Cl. ............................................. H04n 9/24

[58] Field of Search .................................. 178/5.4 H

[56] References Cited

UNITED STATES PATENTS

| | | | |
|---|---|---|---|
| 2,634,325 | 4/1953 | Bond et al. | 178/5.4 H |
| 2,685,047 | 7/1954 | Moore | 178/5.4 H |
| 2,750,533 | 6/1956 | Schwartz | 178/5.4 H |
| 2,490,812 | 12/1949 | Huffman | 178/5.4 H |
| 2,604,534 | 7/1952 | Graham | 178/5.4 H |
| 3,030,439 | 4/1962 | Justice | 178/5.4 H |

*Primary Examiner*—Harvey E. Springborn
*Attorney*—W. L. Keefauver et al.

[57] ABSTRACT

An electron beam is used to scan a striped color pattern arranged parallel to the scan line and the beam is caused to wobble transversely to the scan line so as to impinge on a number of the color stripes during each pass. Sensors located at an edge of the raster but outside the image portion are positioned in pairs — one above and the other below a preselected scan line. Impingement of the scanning beam upon a sensor produces an index signal and the signals from each pair of sensors are applied to opposite inputs of a differential circuit. The resultant difference signal is used to modify the beam deflection system to align the mean scan line with the preselected line so that the proper color information is generated during the entire pass. The technique is useful both in cameras and displays.

6 Claims, 5 Drawing Figures

PATENTED JAN 8 1974 3,784,735

SHEET 2 OF 3

COLOR TELEVISION WITH CONTROL OF A WOBBLING BEAM

BACKGROUND OF THE INVENTION

This invention relates to color television systems, and more particularly to apparatus for controlling the orientation of the beam spot in color cameras and displays.

In many single-gun color television cameras and displays the image is composed of segmented color regions disposed substantially parallel to the scanning direction. Conventionally, these color regions are formed in a repetitive pattern of three primary color stripes and since horizontal scanning is essentially standard, these three-stripe sets are referred to as horizontal color triads. In a camera the triads are bands of light which are scanned by an electron beam to produce a video signal, and in a display the triads are stripes of phosphors which emanate distinctive colors when impinged upon by a scanning beam, the intensity being determined by the video signal. The reproduction of hue is thus determined by the position of the beam spot at a given instant during the scansion. Accordingly, any deviation from the predetermined location of the beam spot will cause a video signal indicative of the wrong color at the camera or alternatively a color emanation of an incorrect color at the display.

Conventionally, each horizontal scan line traverses one color stripe and the deflection circuitry is designed so that the scan line is coincident with the centerline of the horizontal stripe. However, there are numerous factors which may cause the beam to deviate from the anticipated course and such deviation would subsequently produce hue distortion. For instance, the beam spot may not be properly positioned on the centerline at the beginning of a horizontal pass or the scan line could be tilted relative to the centerline of the stripe during the pass.

A number of corrective techniques have been suggested to control the orientation of a beam during linear scanning. At the display, for instance, it is possible to extend the color stripes outside the viewing area and use color-sensitive photodetectors to determine which color stripe is being scanned. At the camera a test area of low transmissivity material may be located outside the image area of the target and this area will generate a component of the video signal which can be used to orient the beam. However, these techniques suffer shortcomings. The color-sensitive detectors required by the former are cumbersome and limit its application to displays, while both methods require synchronous detection to generate a control signal which is vulnerable to noise.

Beam orientation control can also be provided by scanning the horizontal color stripes with a beam having a vertical wobble during the horizontal trace instead of the conventional linear path. For example, an arrangement disclosed by J. W. H. Justice in U.S. Pat. No. 3,030,439, issued Apr. 17, 1962, utilizes index strips positioned across the entire raster and interspersed among the color stripes. These index strips have secondary emission capability so that when impinged upon by the wobbling beam spot, they emanate a light distinctive from that produced by the color stripes. An index signal generated from the optical detection of this light is used to correct deflection.

However, as the interspersed stripes yield identical emanations, identification of the source of the emanations (i.e., determination of the individual index strip being impinged upon) is possible only by a phase or time analysis of the recurring emanations. This necessitates additional circuitry which adds to the complexity and cost of the apparatus, and it is a principal object of the present invention to provide an efficient beam control arrangement for color television which does not require phase comparators or combinations of clocks and gates to generate the proper corrective signals.

In addition, the use of a plurality of index strips located within the image area of the raster inherently degrades the tube's resolution. If the index strips are made thin in order to minimize the loss of resolution, the relatively larger beam aperture will give rise to low intensity light emissions which create small amplitude control signals having low signal-to-noise ratios. Furthermore, light-emitting strips are suitable primarily for a display since the video pickup at a camera would be adversely affected by the emitted light, and of course, at a display cumbersome optical detectors are required. Accordingly, it is another object of the present invention to provide for beam control for color television without reduction of resolution and it is a further object to provide control suitable for cameras as well as displays.

SUMMARY OF THE INVENTION

In accordance with the present invention, the orientation of a scanning beam in a camera or display having a wobbling beam trace for scanning groups of horizontal color stripes disposed on an operative surface is controlled by modifying the vertical deflection in response to signals provided by a pair of sensors associated with each group. The sensors, which are located within the raster, but outside the image region, are symmetrically disposed with respect to the group, one of the pair being aligned with the upper half of the group and the other being aligned with the lower half. The sensors may be simply conductors separated by a nonconductor and the resulting index signals produced in the two conductors due to the wobbling beam are applied to a differential circuit which determines the deviation from the zero difference which would be produced if the beam were precisely aligned with the centerline of the group (the center of the middle stripe if the group is a triad). Any nonzero difference signal indicates an error and it is fed to the deflection mechanism for appropriate correction of the beam orientation. Sensing could also be provided by appropriate optical detection.

Duplicate sensor pairs may be placed at each side of the raster. The pair on one side would detect the beam position at the beginning of each horizontal scan line and provide a static (dc) corrective component to the vertical deflection waveform. The second pair, at the other side, would detect the tilt of the beam and provide a dynamic (ramp) corrective component to the vertical deflection waveform. The tilt correction could be used, for example, to overcome misalignment of the yoke.

Beam position correction is possible with interlaced scanning formats, as well as with noninterlaced scanning. The correction is premised upon a pair of sensors being symmetrically disposed with respect to a recurring group of stripes, but the color stripes of the relevant group may not be constant. In one particular arrangement, an array of color triads is scanned with an interlaced format which causes the wobbling spot to intercept the same color stripe on two successive scan lines, and the sensor associated with this common stripe serves as the lower sensor for the first scan line and the upper sensor for the second.

The correction technique is equally suited to both cameras and displays, but it may be used independently at either. In fact, with appropriate signal processing of the video transmission, the operation of the camera and display may be totally unrelated.

DETAILED DESCRIPTION

Figure 1:
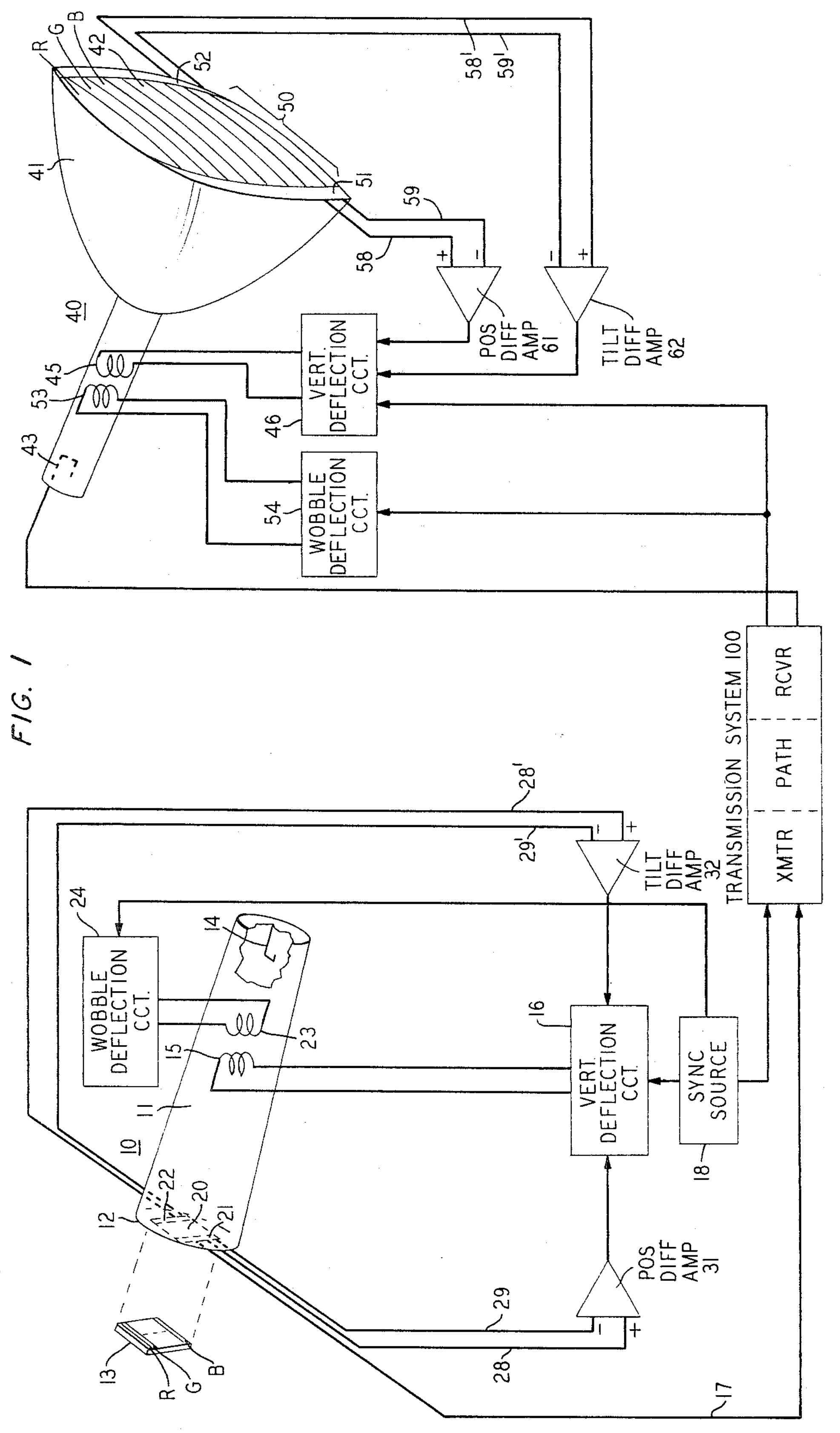
FIG. 1 is a block diagram of a color television system having beam orientation correction at both the camera and display in accordance with the present invention.

The color television system represented in FIG. 1 includes camera 10, transmission system 100 and display 40. The image is focused by conventional optical means, not shown, through striped color filter 13 onto target 12 of image tube 11. Tube 11 may be any type of monochromatic image scanning device, such as a vidicon, PLUMBICON, mosaic-type solid state tube, as is described by M. H. Crowell and E. F. Labuda, "The Silicon Diode Array Camera Tube," Bell System Technical Journal, Vol. 48, No. 5, May–June, 1969, pages 1481–1528, or a flying spot scanner. The tube produces a video output signal indicative of the intensity of light at successively scanned points on target 12. For purposes of illustration, it can be assumed that an electron beam generated by source 14 is deflected in a conventional manner so as to scan the target in a predefined pattern or scansion. The deflection may be by electromagnetic, electrostatic or other means although the invention is in no way limited to any specific deflection technique. For a rectilinear scansion independent horizontal and vertical deflection of the beam is normally provided. Coil 15 is representative of an electromagnetic device (normally a pair of coils) for producing vertical deflection in response to a waveform produced by vertical deflection circuit 16; similar deflection apparatus, which is required for control of the horizontal deflection, is not shown.

The video signal is shown as appearing on lead 17 which is coupled to the photoconductive target 12, but in certain image tubes, such as return beam types, the video signal may be derived from another part of the tube. The video signal produced by tube 11 is applied to transmission system 100 which includes the transmitter, transmission path (wireless or conductive), and receiver, all of which are well known. The specific structure of the transmission system including associated signal processing apparatus, is however, irrelevant to the operation of the invention.

Appropriate synchronization information, which is represented as being supplied by sync source 18, is applied to the horizontal and vertical deflection circuits of camera 10, as well as being applied to the transmission system 100 along with the video signal. The form of its transmission is, of course, unrelated to the invention.

At display 40 the video signal from transmission system 100 is applied to display tube 41, which may be any color picture tube suitable to the format of the video signal delivered from receiver of system 100. The tube illustrated is a single-gun tube having striped regions forming a repetitive pattern of color stripes on its face 42. The video signal controls the electron beam intensity generated by beam source 43 and deflection circuitry similar to that in image tube 11 causes the beam to scan face 42 in a scansion identical to that produced in tube 11. Vertical deflection is provided by representative coil 45 and vertical deflection circuit 46. Again, similar horizontal deflection apparatus is required but not shown. The deflection at camera 10 and display 40 may be synchronized by means of the information derived from sync source 18 via transmission system 100.

Although many types of striped tubes can be employed, the preferred arrangement at the camera utilizes horizontally oriented light passing filter stripes, most conventionally arranged in triads of primary colors, such as red, green and blue, designated R, G and B, respectively. At the display a corresponding horizontally oriented arrangement of phosphor stripes generate the same colors upon being bombarded by an electron beam.

The hue information contained in the video signal is derived from a predetermined relationship between the spatial orientation of the color stripes and the scanning pattern at camera 10, and a similar relationship determines the color content of the reproduction at display 40. Accordingly, true color representation will result only if the scanning beams at both the camera and display are at all times during the scansion impinging the anticipated color regions. For example, during each horizontal trace from right to left across target 12, where the right and left sides of the target are defined as seen from the front of the tube, the position of the beam spot at the beginning of the trace and the tilt of the scan line across the face of the target must be controlled to prevent color distortion. Uncorrected errors in deflection control occurring at the camera, display or both, could create inaccurate beam orientation which would cause distorted reproduction.

In accordance with the present invention, vertical areas at the right and left sides of target 12 are designated as control zones 21 and 22, respectively, and in addition to the conventional horizontal and vertical deflection, an additional deflection of the scanning beam in a vertical direction is produced by conventional means represented by coil 23 and its associated wobble deflection circuit 24. This additional deflection causes the scanning beam to oscillate or wobble vertically during each horizontal trace. The image is focused on target 12 in an image region 20 which is bounded by zones 21 and 22, but the scansion includes these control zones and the effect of the wobbling beam upon sensors located in zone 21 is used to modify the vertical waveform produced by circuit 16 to precisely locate the starting position of the scanning beam at the beginning of each horizontal pass.

In a similar manner, sensors in zone 22 are used to detect the location of the beam spot at the end of each horizontal trace and this information is utilized to modify the vertical deflection waveform to correct for the tilt during the horizontal traces.

Face 42 of display tube 41 also includes vertically positioned control zones 51 and 52 at the left and right sides of image viewing area 50, as seen by a viewer, respectively. In association with the wobble deflection produced by coil 53 and wobble deflection circuit 54, zone 51 creates position control and zone 52 is used for tilt control.

Although positioning and tilt control is shown as being provided at both the camera and the display, the positioning correction may be utilized independently of the tilt control and may also be provided either at the camera alone or at the display alone. In fact, the wobble scan may be used at only one end of the system if appropriate video processing is provided by transmission system 100. However, if wobbling is used at both the camera and display, the wobble deflection at display 40 must be synchronized with the format of the received video signal, and it is simplest to synchronize both wobble circuits to a common source such as 18, as shown.

Figure 3:
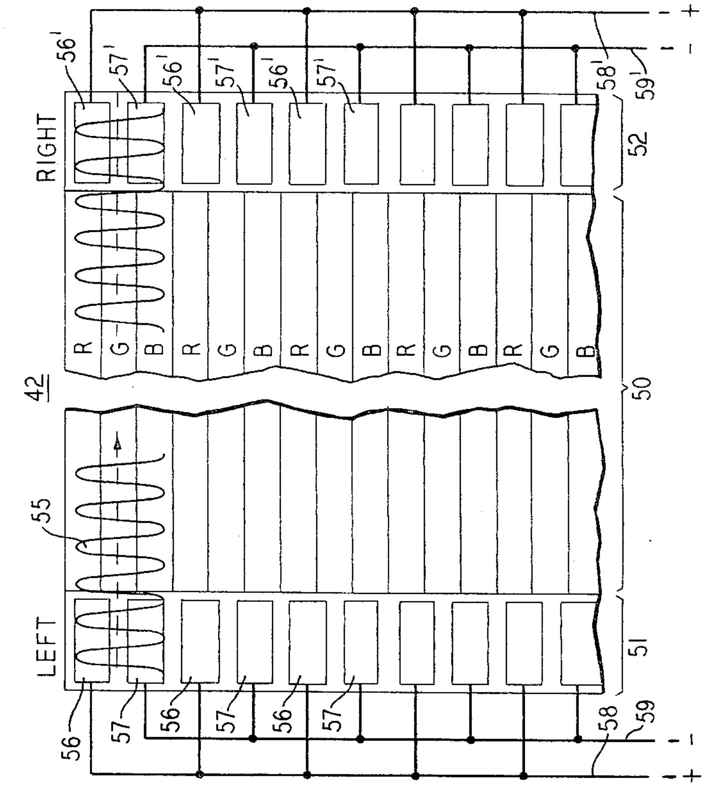
FIGS. 2 and 3, which illustrate sections of the target and face of the camera and display in the system of FIG. 1, respectively, show the beam-sensing apparatus in accordance with the present invention.
Figure 2:
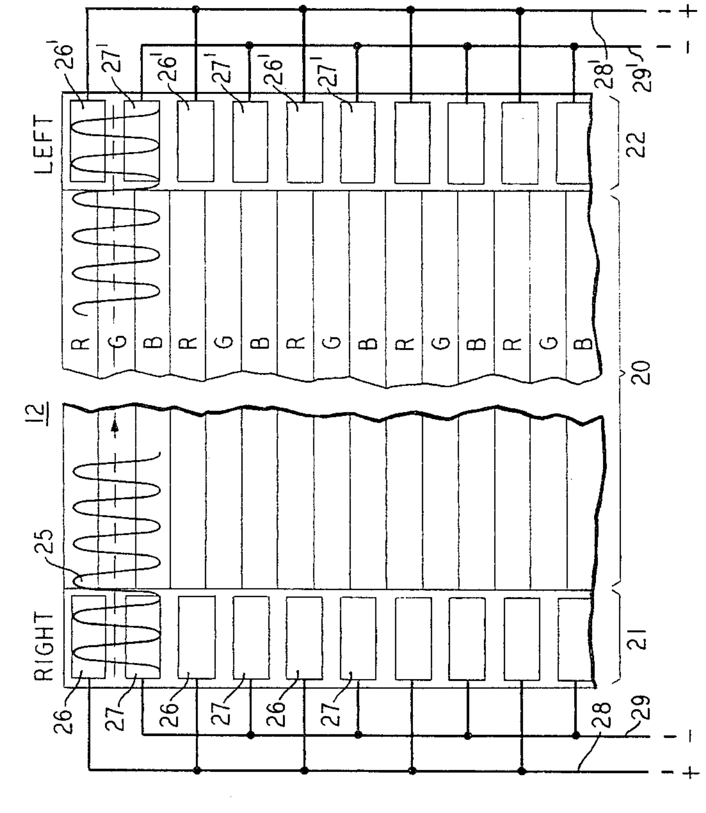

The operation of the invention can be better understood by considering FIG. 1 in conjunction with FIGS. 2 and 3 which represent section views of small portions of target 12 and face 42 of tubes 11 and 41, respectively. At the camera the image is formed on target surface 12 in a striped color pattern in accordance with the color stripe arrangement produced by filter 13. The sinusoidally wobbling path 25 of the scanning beam spot represents one horizontal trace extending from the right to the left of target 12 through position control zone 21, image region 20 and tilt control zone 22. In position zone 21 pairs of conductors 26 and 27 are aligned parallel to the color stripes and each pair is associated with a single triad of color stripes. Conductors 26 and 27 act as sensors and are symmetrically disposed with respect to the centerline of the middle stripe of each triad, shown in FIG. 2 as the green stripe. The extension of this centerline forms the midline of the separation gap or insulation between conductors 26 and 27, which are each preferably at least as wide as the color stripes.

The scanning electron beam will generate an index current in each conductive sensor in proportion to the number of electrons impinging upon it, and hence, due to the wobbling pattern and electron beam diameter, if the mean vertical position of the wobbling trace is located precisely between conductors 26 and 27, the current induced in each will be identical, indicating that the mean position of the scanning spot is located precisely along the center line of the middle stripe as desired.

Conductive sensors 26 are aligned with the upper half of the respective triads of red, green and blue stripes, and these are all connected to a single lead 28; sensors 27 are aligned with the lower half of the same triads and are connected to a single lead 29. As can be seen from FIG. 1 both leads 28 and 29 are applied to position differential amplifier 31. The current on lead 28 from upper conductive sensors 26 is applied to the positive input of amplifier 31 while the current on lead 29 from the lower sensor 27 is similarly applied to the negative input, and the amplifier output is a dc position control signal which is proportional to the difference in the currents appearing on leads 28 and 29. If the position of the spot is above the center line, a positive dc position control signal will be applied to vertical deflection circuit 16 and the dc component will be used to shift the vertical deflection waveform in a step-function thus relocating the mean position of the scan line to the appropriate position. A zero dc position signal is, of course, the objective, indicating a precisely centered static beam-starting position.

In tilt control zone 22 sensing conductors 26′ and 27′ are positioned and interconnected to leads 28′ and 29′, respectively, in the same manner as conductors 26 and 27 are positioned and connected to leads 28 and 29. Similarly, the index currents on leads 28′ and 29′ are applied to tilt deflection amplifier 32 which produces a zero tilt signal if the mean line of the wobbling trace is located along the center line of the middle strip at the left side of the target. Any deviation up or down produces a nonzero ramp output signal which indicates that the horizontal trace was tilted in its transit from the right to left side of target 12. This tilt control ramp signal whose sign depends upon the direction of deviation (positive for an upward deviation in FIG. 2), is added to the vertical deflection waveform generated by deflection circuit 16 in order to provide dynamic control of the tilt of succeeding scan lines. It is noted again, of course, that correcting the position alone on the right side of the target will enhance reproduction; the tilt correction provides an additional and independent improvement.

The pairs of conductive sensors 26 and 27 (or 26′ and 27′) may, of course, be replaced by other types of sensors such as pairs of material having distinctive optical properties, but corresponding pairs of detectors would be required to generate the control signals. Alternatively, each sensor could be simply an array of photodetectors. These specialized sensor arrangements will, of course, have only limited application.

The image seen by camera 10 may be reproduced on many types of reproduction devices such as shadow mask or TRINITRON tubes without position or tilt correction ability. However, FIG. 3 illustrates face 42, the viewing surface of display 40, as a near duplicate of the camera target in FIG. 2. The display utilizes synchronized wobble scanning and provides position and tilt control.

Face 42, the operative surface of display tube 41, is composed of horizontally oriented red, green and blue phosphor stripes which emanate their appropriate light upon bombardment by the electron beam which is shown in FIG. 3 to trace out a sinusoidally wobbling pattern 55 in synchronism with trace 25 in camera 10. Conductive sensor pairs 56, 57 and 56′, 57′ correspond respectively to sensor pairs 26, 27 and 26′, and 27′ in FIG. 2. The sensors are similarly connected to leads 58, 59, 58′ and 59′, and the index current on each lead is applied to the appropriate input of either position or tilt differential amplifier 61 or 62 as illustrated in FIG. 1. The dc control signal from amplifier 61 is used to correct the beam spot position at the left side (in zone 51) of face 42 in the same manner as a beam spot position is controlled at camera 10. Similarly, tilt is corrected by a ramp signal in response to the detection in zone 52 at the right side of face 42 as it is at the camera. These tilt and position controls are, of course, independent of each other.

Figure 4:
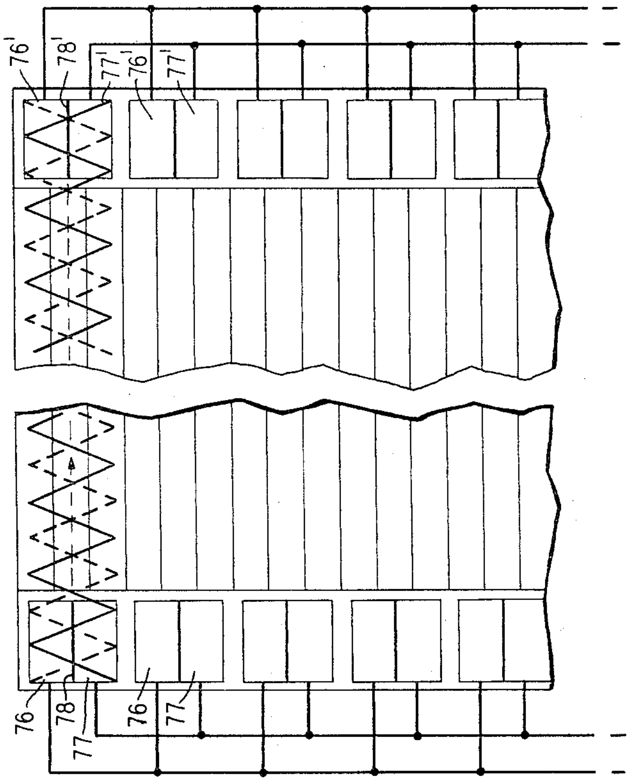

FIG. 4 illustrates a target in which the beam position and tilt corrective arrangements have been modified for improved operation. These variations apply equally to a display. Position sensors 76 and 77, as well as tilt sensors 76' and 77' operate in a manner similar to sensors 26, 27, 26', and 27' in FIGS. 1 and 2, but they are enlarged in the vertical direction. Since the current is proportional to beam diameter intercepted by the sensor and the time of interception, currents derived from enlarged sensors are larger and hence more accurate than those derived from the smaller sensors shown in FIGS. 2 and 3. The larger sensors are also placed very close together so that they both abut a fine line 78 or 78' which is the extension of the centerline of the middle stripe of the triad. Midlines 78—78' which are preferably substantially thinner than the diameter of the scanning spot, may be nonconductive gaps or insulating material produced by an etching or other conventional process. The narrowness of the midlines makes possible exceedingly fine correction of beam position since some differential control signal will be detectable unless the wobble pattern is centered precisely upon the line.

FIG. 4 also illustrates a triangular wobble pattern as an alternative to the sinusoidal wobble in FIGS. 2 and 3. In addition, an interlaced format is shown; the triangularly wobbling trace 75 is overlaid by an identical trace 75A which is displaced in phase by 180 degrees. Traces 75 and 75A represent lines in successive fields of a 2:1 wobble interlace scan. This entwined format will tend to reduce flicker and visible line structure. Other interlace ratios such as 3:1 or 4:1 are also possible.

In the configurations of FIGS. 2, 3 and 4, if a beam trace deviates severely from its proper mean scan line, the beam may intercept the sensor associated with the next group of stripes and this would generate a counter-corrective index current. For instance, if the beam dropped below the triad being scanned, it would generate a negative current by virtue of intercepting the lower sensor associated with the triad, but it may also intercept the upper sensor of the next lower triad and this would create a contrary positive index current. This problem is minimized by limiting the size of the sensors and separating sensor pairs by nonconductive guard spaces as shown in FIG. 4.

Figure 5:
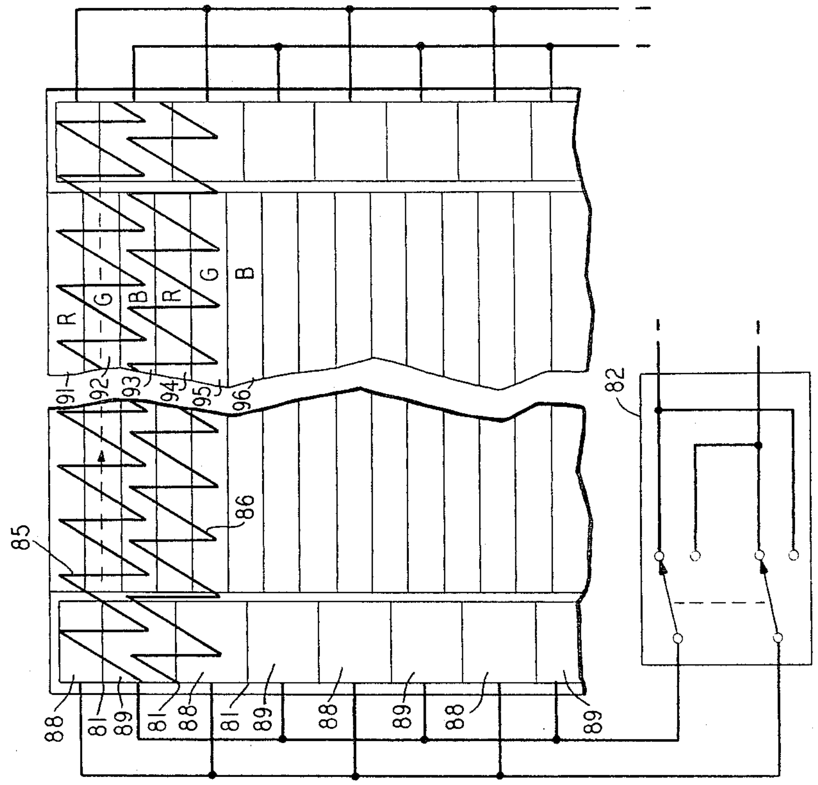
FIGS. 4 and 5 illustrate alternative arrangements of the apparatus of FIGS. 2 and 3.

The sensors can be enlarged to a vertical dimension of two stripe widths and eliminate the guard spaces if the scanning format is modified. FIG. 5 illustrates the maximized sensor arrangement and the appropriate format. Traces 85 and 86 are generated in successive lines of the same field and as can be seen, the first trace 85 will cover a triad of red, green and blue stripes 91, 92 and 93, while the second scan line 86 will cover a triad of stripes 93, 94 and 95. Stripe 93 is thus common to both successive scan lines. Since the correction technique requires a pair of sensors for each triad (one for the upper and one for the lower portion) oriented symmetrically to the centerline of the middle stripe, the redundant scanning of a common stripe necessitates modification of the correction mechanism.

While trace 85 scans the triad 91, 92 and 93, one of sensors 88 serves as the upper portion sensor and one of sensors 89 serves as the lower portion sensor. However, during trace 86, the same sensor 89 serves as the upper sensor and the next sensor 88 serves as the lower sensor. To accomodate this continuous change in triads, sensors 88 and 89 are arranged continuosuly in the vertical direction except for insulating lines 81 oriented along the extensions of the centerlines of alternate stripes, notwithstanding their colors. These alternate stripes, such as 92, 94 and 96, are in fact, the middle stripe of each successive scanned triad. It is evident that in order to have the proper input applied to the correction amplifiers (that is, according to the convention assumed above in regard to FIG. 1, the positive input from the upper sensors) the leads connected to the amplifiers must be interchanged with each successive scan line. This is illustrated by a simple mechanical switch 82 which represents an electronic switch of appropriate design. The arrangement of the tilt sensors is identical to the position sensors and another switch would of course, be required.

The sawtooth wobble shown in traces 85 and 86 is merely illustrative of a pattern alternative to the sinusoidal and triangular traces shown in FIGS. 2, 3 and 4. Of course, the shape of the wobble pattern is essentially irrelevant to the operation of the invention, provided that the pattern is symmetrical about the mean horizontal scan line, and any conventionally generated pattern can be used.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. Color television apparatus comprising:

a surface having an image area on which an image is formed, periodically repetitive groups of horizontally oriented color stripes positioned within the image area, a plurality of sensors located on the surface in one sensing zone, the one sensing zone being adjacent to but exclusive of the image area, all of the plurality of sensors in the one sensing zone being located in a single vertical column and positioned such that for each group of stripes two sensors constitute a pair of sensors associated with said each group, the pair of sensors in the one sensing zone associated with each group being disposed symmetrically with respect to an extension of the horizontal centerline of said each group, means for producing an electron beam, deflection means for causing said beam to scan the surface horizontally with periodic vertical variations during each horizontal trace so that the beam repetitively impinges all of the stripes of a group and the associated pair of sensors in the one sensing zone during each horizontal trace, means for producing an index signal in response to the impingement of the beam upon each sensor, and means for controlling said deflection means by utilizing the index signals from the sensors to essentially center the horizontal trace upon the extended centerline.

2. Color television apparatus as claimed in claim 1 wherein said plurality of sensors are each formed of conductive material and generate an index current when impinged upon by an electron beam.

3. Color television apparatus as claimed in claim 2 wherein each of said groups is a triad of three color stripes, one sensor of each pair of sensors is associated with the upper half of a triad, is located in the one sensing zone above the extended centerline of that triad and is interconnected by a first common lead to all other of said one sensors associated with the upper half of a triad, a second sensor of each pair of sensors is associated with the lower half of a triad, is located in the one sensing zone below the extended centerline of that triad and is interconnected by a second common lead to all other of said second sensors associated with the lower half of a triad, and said means for controlling said deflection means includes differential circuit means having two inputs for producing a control signal indicative of the difference between the signals applied to the two inputs, said first common lead being applied to one input and said second common lead being applied to the other input, and said control signal being applied to the deflection means.

4. Color television apparatus as claimed in claim 1 wherein said horizontal trace extends from one side of the surface to the other side of the surface, said one sensing zone being located on said one side of the surface, said apparatus further comprising a second plurality of sensors located on the surface in a second sensing zone, the second sensing zone being adjacent to but exclusive of the image area and being located on the other side of the surface, said second plurality of sensors being located in a single vertical column in the second sensing zone and positioned such that for each group two sensors constitute a pair of sensors associated with that group, the pair of sensors in the second sensing zone associated with each group being disposed symmetrically with respect to an extension of the horizontal centerline of said group, said controlling means producing a dc signal from the index signals produced by the impingement of the beam upon the sensors in one sensing zone on the one side of the surface to vertically shift the position of the beam at the one side, and said controlling means producing a ramp signal from the index signals produced by the impingement of the beam upon the sensors in the second sensing zone on the other side of the surface to modify the tilt of the beam trace from the one side to the other side.

5. Color television apparatus as claimed in claim 1 wherein said surface is a target and said horizontally positioned color stripes are focused segments of colored light formed by a striped optical filter.

6. Color television apparatus as claimed in claim 1 wherein said surface is a viewing surface and said horizontally positioned color stripes are phosphor stripes, each emanating a distinctive light when bombarded by electrons.

* * * * *